United States Patent
Haug et al.

(10) Patent No.: US 9,081,684 B2
(45) Date of Patent: Jul. 14, 2015

(54) DATA RECOVERY OF DATA SYMBOLS RECEIVED IN ERROR

(71) Applicant: Landis+Gyr Technologies, LLC, Pequot Lakes, MN (US)

(72) Inventors: Stuart L. Haug, Hackensack, MN (US); Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 120 days.

(21) Appl. No.: 14/012,492

(22) Filed: Aug. 28, 2013

(65) Prior Publication Data

US 2015/0067431 A1  Mar. 5, 2015

(51) Int. Cl.
*H03M 13/00* (2006.01)
*G06F 11/08* (2006.01)

(52) U.S. Cl.
CPC ...................... *G06F 11/08* (2013.01)

(58) Field of Classification Search
CPC . H04L 1/0021; H04L 1/203; H04L 25/03828; H04L 9/28
USPC .................. 370/210; 714/820, 748
See application file for complete search history.

(56) References Cited

U.S. PATENT DOCUMENTS

| | | | |
|---|---|---|---|
| 4,692,761 A | 9/1987 | Robinton | |
| 6,359,938 B1 | 3/2002 | Keevill et al. | |
| 6,442,145 B1 | 8/2002 | De Lange et al. | |
| 6,535,551 B1 | 3/2003 | Sweitzer et al. | |
| 6,546,046 B1 | 4/2003 | Sweitzer et al. | |
| 6,570,915 B1 | 5/2003 | Sweitzer et al. | |
| 6,643,469 B1 | 11/2003 | Gfeller et al. | |
| 6,687,315 B2 | 2/2004 | Keevill et al. | |
| 6,829,294 B2 | 12/2004 | Sweitzer et al. | |
| 6,956,814 B1 * | 10/2005 | Campanella | 370/210 |
| 7,196,644 B1 | 3/2007 | Anderson et al. | |
| 7,512,074 B2 | 3/2009 | Strutt et al. | |
| 7,616,706 B2 | 11/2009 | Koslov | |
| 7,729,373 B2 | 6/2010 | Dale et al. | |

(Continued)

FOREIGN PATENT DOCUMENTS

| | | |
|---|---|---|
| EP | 2023520 A1 | 2/2009 |
| EP | 1592162 B1 | 2/2011 |
| WO | 2009031801 A2 | 12/2009 |

OTHER PUBLICATIONS

DSCPRelated.com "Confused about complex signal," Dec. 6, 2008 (retrieved Oct. 22, 2014), www.dsprelated.com/showmessage/106186/1.php>.

(Continued)

*Primary Examiner* — David Ton
(74) *Attorney, Agent, or Firm* — Crawford Maunu PLLC

(57) ABSTRACT

In one or more embodiments, a data processing apparatus is configured to receive data symbols transmitted from one or more endpoint devices. Each of the data symbols is transmitted in a respective temporal position assigned for communication by one of the plurality of endpoints. The data processing apparatus is configured to recover data from two or more transmission(s)/retransmission(s) (of the same data) that are received in error and have different temporal positions. The corresponding data symbols in error are phase-aligned per a common reference point and energy is accumulated therefrom. The data processing apparatus discerns correct data values from the accumulated energy.

20 Claims, 8 Drawing Sheets

(56) References Cited

U.S. PATENT DOCUMENTS

| | | |
|---|---|---|
| 7,765,453 B2 | 7/2010 | Duggan |
| 7,773,581 B2 | 8/2010 | Punj et al. |
| 7,975,109 B2 | 7/2011 | McWilliams et al. |
| 8,018,379 B1 | 9/2011 | Sun et al. |
| 8,300,657 B2 | 10/2012 | Dale et al. |
| 8,315,341 B2 | 11/2012 | Razazian et al. |
| 8,359,530 B2 | 1/2013 | Sawai et al. |
| 8,391,405 B2 | 3/2013 | Kwon et al. |
| 8,405,546 B1 | 3/2013 | Yeh et al. |
| 8,410,979 B2 | 4/2013 | Sun et al. |
| 8,484,370 B1 | 7/2013 | Coffee et al. |
| 8,489,979 B2 | 7/2013 | Rub |
| 2009/0066528 A1* | 3/2009 | Bickel et al. .............. 340/657 |
| 2010/0222076 A1* | 9/2010 | Poon et al. ................ 455/456.1 |
| 2011/0004324 A1* | 1/2011 | Bickel et al. .................... 700/3 |
| 2011/0043340 A1 | 2/2011 | Kim et al. |
| 2011/0059762 A1* | 3/2011 | Jones et al. ................... 455/522 |
| 2012/0084559 A1* | 4/2012 | Bonicatto .................... 713/162 |
| 2012/0106664 A1 | 5/2012 | Bonicatto et al. |
| 2012/0121046 A1 | 5/2012 | Choi et al. |
| 2012/0130656 A1 | 5/2012 | Bickel |
| 2013/0181847 A1 | 7/2013 | Willig et al. |
| 2013/0215933 A1 | 8/2013 | Young et al. |

OTHER PUBLICATIONS

International Search Report for PCT/US2014/052992, Nov. 28, 2014.

* cited by examiner

DATA RECOVERY OF DATA SYMBOLS RECEIVED IN ERROR

BACKGROUND

Digital communication over noisy channels (e.g., over power lines and wireless mediums) poses a challenge to reliable, error-free data transfer between a transmitter and receiver. Portions of the transmitted data may be corrupted by noise, resulting in errors at a receiver. Some methods for communicating data symbols over noisy channels request retransmission of any data symbols received in error. These methods rely on the probability that the retransmission will occur during less-noisy channel conditions and the data will be received error-free. However, if the channel is still excessively noisy, there will likely be errors in the retransmitted symbols, and nothing would be gained by the retransmission.

SUMMARY

Aspects of the present disclosure are directed to network applications for recovery of data from data symbols communicated in error, and that are applicable to a variety of applications, devices, systems and methods. One or more embodiments provide for recovery of data from a plurality of transmissions (of the same data) that are received in error. The corresponding data transmissions in error are aligned per a common reference point and energy is accumulated therefrom. Data is then discerned from the accumulated energy.

Some embodiments provide for communication in power line communication networks. For instance, in one or more embodiments, a system includes a plurality of endpoints (e.g., power meters) configured to provide data power meter reports to a data processing apparatus (e.g., central command station) over a plurality of data channels. The data processing apparatus is configured to interact with the plurality of endpoints and receive data symbols (i.e., one or more bits) transmitted by the endpoint over one or more power lines using the plurality of communications channels. Each of the data symbols is transmitted in a respective temporal position assigned for communication by one of the plurality of endpoints.

For each of the plurality of communications channels, the processing apparatus determines temporal positions for the data symbols received over the communications channel. For at least two data symbols corresponding to failed transmissions of the same data symbol and having different temporal positions, the processing apparatus aligns phases of the data symbols per a common reference point. The processing apparatus accumulates energy from the aligned data symbols and discerns data from the communications signals that are received over the communications channels. The processing apparatus provides the discerned data in the form of a recovered data symbol.

As more generally applicable to some other applications, in some embodiments, a system includes one or more endpoint devices configured to transmit data over various transmission mediums (e.g., copper wire, fiber optics, wireless). The system includes a data processing apparatus having a data communication circuit communicatively coupled to the one or more endpoint devices and being configured and arranged to data symbols transmitted by the endpoint devices over the plurality of communications channels. For each of the plurality of communications channels, the data communication circuit determines temporal positions for the data symbols received over the communications channel. The received data symbols include at least two data symbols having different respective temporal positions, and where one of the at least two data symbols is a retransmission of the other of the at least two data symbols. With phases of the at least two data symbols aligned per a common reference point, the data communication circuitry is configured to accumulate energy of the at least two data symbols and determine a third data symbol from the accumulated energy.

These and other aspects of the present disclosure are exemplified in a number of implementations and applications, some of which are described in the accompanying drawings and the description below. Other features, aspects, and advantages of the subject matter will become apparent from the description, the drawings, and the claims.

BRIEF DESCRIPTION OF THE DRAWINGS

The invention may be more completely understood in consideration of the following detailed description of various embodiments of the invention in connection with the accompanying drawings, in which.

Figure 1:
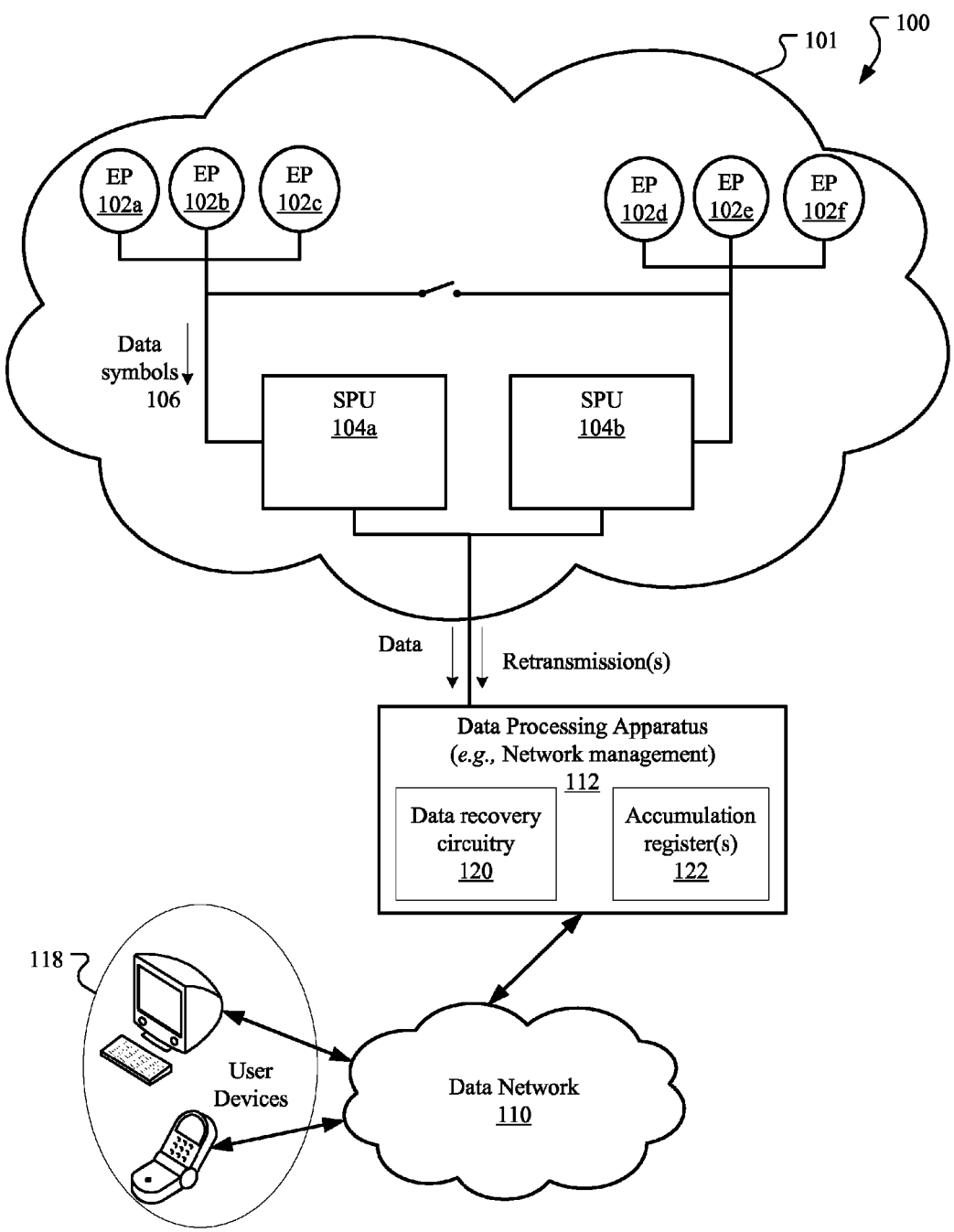
FIG. 1 is a block diagram of an example network environment in which endpoints transmit data.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

One or more embodiments of the present disclosure provide systems and methods for recovery of data from a plurality of transmissions (of the same data) that are received in error. Phases of the corresponding data transmissions in error are aligned per a common reference point and energy is accumulated therefrom. Correct data values are discerned from the accumulated energy.

As exemplified in the ensuing discussion of power line communication (PLC) networks, in some embodiments, a plurality of endpoint devices (e.g., power meters) are configured to provide data symbols (e.g., power meter reports) to a data processing apparatus (e.g., central command station) over a plurality of data channels on a power line. The data processing apparatus is configured to receive data symbols represented by signals transmitted by the endpoint devices over the plurality of communications channels. Each of the data symbols is transmitted in a respective temporal position assigned for communication by one of the plurality of endpoints.

For each of the plurality of communications channels, the processing apparatus determines temporal positions for the data symbols received over the communications channel. For at least two of the received data symbols, having different temporal positions and one being a retransmission of the other, the processing apparatus aligns the at least two data symbols per a common reference point. The processing apparatus accumulates energy from the aligned data symbols and discerns data from the communications signals that are received over the communications channels. The processing apparatus provides the discerned data in the form of a data symbol.

As more generally applicable to some other applications, in some embodiments, one or more endpoint devices are configured to transmit data over various transmission mediums (copper wire, fiber optics, and/or wireless). In some embodiments, a data processing apparatus includes a communication circuit communicatively coupled to one or more endpoint devices. The communication circuit is configured to receive data symbols transmitted by the endpoint devices over the plurality of communications channels. For each of the plurality of communications channels, the data communication circuitry determines temporal positions for the data symbols received over the communications channel. The received data symbols include at least two of the data symbols having different respective temporal positions with one of the at least two of the data symbols being a retransmission of the other of the at least two data symbols. With phases of the at least two data symbols aligned per a common reference point, the data communication circuitry is configured to accumulate energy of the at least two data symbols and determine a third data symbol from the accumulated energy.

In various embodiments, data symbols may be transmitted/retransmitted individually or as part of a group of symbols (e.g., a data packet). In some implementations, retransmissions are performed individually for each symbol received in error. In some other implementations, a group of different data symbols (e.g., a data packet) may be retransmitted in response to any symbol in the group of data symbols being received in error. While embodiments are not so limited, for ease of reference, many of the examples are primarily discussed with reference to transmission and retransmission of an individual data symbol.

Different embodiments may utilize different schemes for retransmission of data symbols received in error. In some embodiments, each transmission/retransmission includes a single copy of the data symbol to be transmitted. In some embodiments, each transmission/retransmission includes multiple copies of a data symbol to be communicated. In some embodiments, the number of copies of the data symbol included in each transmission and/or retransmission may be adjusted based on the amount of noise in a particular environment. In some implementations, such adjustment may be performed based on various indicators of channel conditions including but not limited to error rate and/or signal to noise ratio (SNR).

In some embodiments, the endpoint devices are configured to retransmit a data symbol if a transmission is not acknowledged by the data processing apparatus within a certain amount of time. In some other embodiments, retransmission may be initiated by a retransmission request sent from the data processing apparatus. For instance, in some implementations, the data processing apparatus is configured to accumulate data symbols in response to receiving a data symbol in error. If the correct value cannot be determined from the accumulated data, the data processing apparatus requests retransmission of the data symbol or symbols received in error.

Energy is respectfully accumulated for transmission/retransmission(s) in error of the same data symbol. Each transmission/retransmission of the data symbol is modulated with the same encoding scheme and is phase aligned with the other data symbols (to be accumulated) per a common reference point (e.g., beginning of symbols or end of symbols). This approach can be modified by changing the modulation by attempting to mitigate the signal's susceptibility to noise, so long as the transmission and retransmission of the data symbol are sent using the same modulation scheme.

Various embodiments may encode data symbols using various different modulation schemes which may modulate, e.g., frequency, amplitude, and/or phase of a signal to encode a data value. In some modulation schemes, multiple data values are encoded in respective phases of a data symbol. For instance, quadrature amplitude modulation (QAM) modulates an in-phase signal (I) with a first data value, and quadrature phase signal (Q) (e.g., rotated by 90 degrees from the in-phase signal) with a second data value. For data symbols that include multiple phase components (e.g., I and Q components), energy is accumulated from data symbols received in error by accumulating each phase component separately. For instance, in an implementation utilizing QAM to encode data symbols, the processing apparatus is configured to accumulate energy of two data symbols in error by accumulating energy of the I signal components to produce an accumulated I value and accumulating energy of the Q signal components to produce an accumulated Q value. A correct I component value of the data symbol to be recovered is discerned from the accumulated I value. Similarly, a correct Q component value of the data symbol to be recovered is discerned from the accumulated Q value.

Turning now to the figures, FIG. 1 shows a block diagram of an example network environment 100 in which endpoints 102 transmit data in accordance with one or more embodiments of the present disclosure. The network environment 100 includes a service network 101 in which a plurality of endpoints 102a-102f are coupled (e.g., communicatively coupled) to substation processing units (SPUs) 104a, 104b. SPUs provide communications received from the endpoints 102a-102f to a data processing apparatus 112 (e.g., a network management apparatus). The data processing apparatus (e.g. 112) is configured to process communications that are received from SPUs 104a, 104b and/or control aspects of the service network which is based, at least in part, on the communications provided by the SPUs 104a, 104b. The data processing apparatus 112 is configured to recover data from a plurality of transmissions/retransmissions (of the same data) that are received in error. Phases of the corresponding data transmissions in error are aligned by the data processing apparatus per a common reference point and energy is accumulated therefrom. Correct data values are then discerned from the accumulated energy. In this example, the data processing apparatus 112 includes a data recovery circuit 120 configured to store accumulated values (e.g., accumulated I values and accumulated Q values) of data symbols received in error in accumulation register(s) 122. The data recovery circuit 120 is further configured to discern correct data value(s) of data symbols received in error using the accumulated values in the accumulation register(s) 122.

The endpoints 102 can be any device capable of transmitting data in the network environment 100. For example, the endpoints 102 can be, e.g., meters in a utility network (e.g., electricity meters, gas meters, or water meters), computing devices, television set top terminals, or telephones that transmit data in the service network 101. The endpoints 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. The endpoints 102 report the operating characteristics of the service network 101 over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication networks that dynamically allocate available bandwidth according to an orthogonal frequency division multiple access (OFDM) spectrum allocation technique or another channel allocation technique (e.g., Time Division Multiple Access, Code Division Multiple Access, and other Frequency Division Multiple Access techniques).

In some embodiments, the endpoints 102 are power meters in a power distribution network and transmit reporting data to the data processing apparatus 112. The reporting data may include, e.g., measures of total power consumption, power consumption over a specified period of time, peak power consumption, instantaneous voltage, peak voltage, minimum voltage and other measures related to power consumption and power management (e.g., load information). In some implementations, each of the power meters can also transmit status data that specify a status of the power meter (e.g., operating in a normal operating mode, emergency power mode, or another state such as a recovery state following a power outage).

In some implementations, data symbols (i.e., one or more bits) including the reporting and/or the status data are continuously or intermittently transmitted over a specified symbol period. A symbol period is a period of time over which a particular symbol is transmitted. A symbol period for each symbol transmitted by a power meter can be less than or equal to the time interval (i.e., 1/update rate) at which updated meter information is required to be provided. For example, in one implementation, a particular meter is required to provide updated meter information every 20 minutes (i.e., the specified update rate for the meter). In this example, a meter can transmit a symbol representing at least a portion of a first set of updated meter information for twenty minutes, and then transmit another symbol representing a next set of updated meter information for a subsequent twenty minutes. The update rate for a meter can be specified by a network administrator based, for example, on types and amounts of updated meter information that are being received from the meter, preferences of a customer (e.g., a power company) to whom the data is being provided, and/or channel characteristics of the channel over which the data is being transmitted. An update rate of 20 minutes is used for purposes of example, but other update rates (e.g., 1 minute, 5 minutes, 10 minutes, 1 hour, or 1 day) can be used.

In FIG. 1, endpoints 102a-102c and 102d-102f transmit symbols 106 over communications channels to substation processing units 104a, 104b, respectively. A substation processing unit (SPU) is a data processing apparatus that receives communications from endpoints to manage the service network 101 or for transmission to a data processing apparatus 112 and/or through a data network 110. For example, a SPU (e.g., 104a) can include a receiver that receives symbols from endpoints (e.g., 102a-102c) and logs data from the symbols. A SPU can also take action based on the data received from the endpoints and transmit the symbols to a data processing apparatus 112 that manages the service network 101. SPUs 104a, 104b can transmit the individual symbols or generate a consolidated packet 108 that includes data from multiple symbols received from the endpoints 102a-102f.

In some implementations, a single SPU (e.g., 104a) can be configured to receive symbols from thousands of endpoints and transmit the symbols to a data processing apparatus 112. The data processing apparatus 112 is a data processing apparatus that processes communications that are received from SPUs 104a, 104b and/or controls aspects of the service network based, at least in part, on information extracted from the symbols that were received from the SPUs 104a, 104b.

In some embodiments, the data processing apparatus 112 in a PLC network can receive data indicating that power usage is significantly higher in a particular portion of a power network than in other portions of the power network. Based on this data, the data processing apparatus 112 can allocate additional resources to that particular portion of the network (i.e., load balance) or provide data specifying that there is increased power usage in the particular portion of the power network.

In some implementations, the data processing apparatus 112 provides data to user devices 118 that can be accessed, e.g., by the network operator, maintenance personnel and/or customers. For example, data identifying increased power usage can be provided to a user device 118 accessible by the network operator, who can, in turn, determine an appropriate action regarding the increased usage. Additionally, data identifying a time-of-use measure and/or a peak demand measure can also be provided to the user device 118. Similarly, if there has been a power outage, the data processing apparatus 112 can provide data to user devices 118 that are accessible by customers to provide information regarding the existence of the outage and potentially provide information estimating duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two SPUs 104a, 104b and one data processing apparatus 112 are shown, the service network 101 can include many different SPUs that can each communicate with thousands of endpoints and many different data processing apparatus that can each communicate with multiple SPUs.

Symbols from a particular endpoint (e.g., 102a) may be transmitted over one of thousands of communications channels in a PLC system. For example, each endpoint can be assigned a particular channel using OFDM or another channel allocation technique. When endpoints 102a-102f are installed in the service network 101, the endpoints 102a-102f can each be assigned a symbol period. The symbol period that is assigned to a particular endpoint can be selected, for example, based on signal characteristics (e.g., signal amplitude) of communications signals that represent the symbols and are received at a SPU, relative to the amplitude of the noise floor that is present on the channel over which the communications signals are being received. Each endpoint can be independently assigned a symbol period, such that different endpoints may transmit symbols over different symbol periods. For example, endpoint 102a may transmit each symbol over a 5 minute unit interval, while endpoint 102b may transmit each symbol over a 20 minute unit interval. Once an endpoint is assigned a symbol period, the symbol period can be stored in a memory circuit (not shown in FIG. 1) and indexed to (i.e., associated with) the endpoint and/or the channel over which the symbols from the endpoint are received.

The data processing apparatus 112 and/or the SPUs 104a, 104b can access the memory circuit to identify the symbol period that has been assigned to the endpoint. Using the symbol period, the SPUs 104a and 104b can determine how long energy from each of the endpoints should be accumulated in order to recover the symbol being transmitted by the endpoint.

Figure 2:
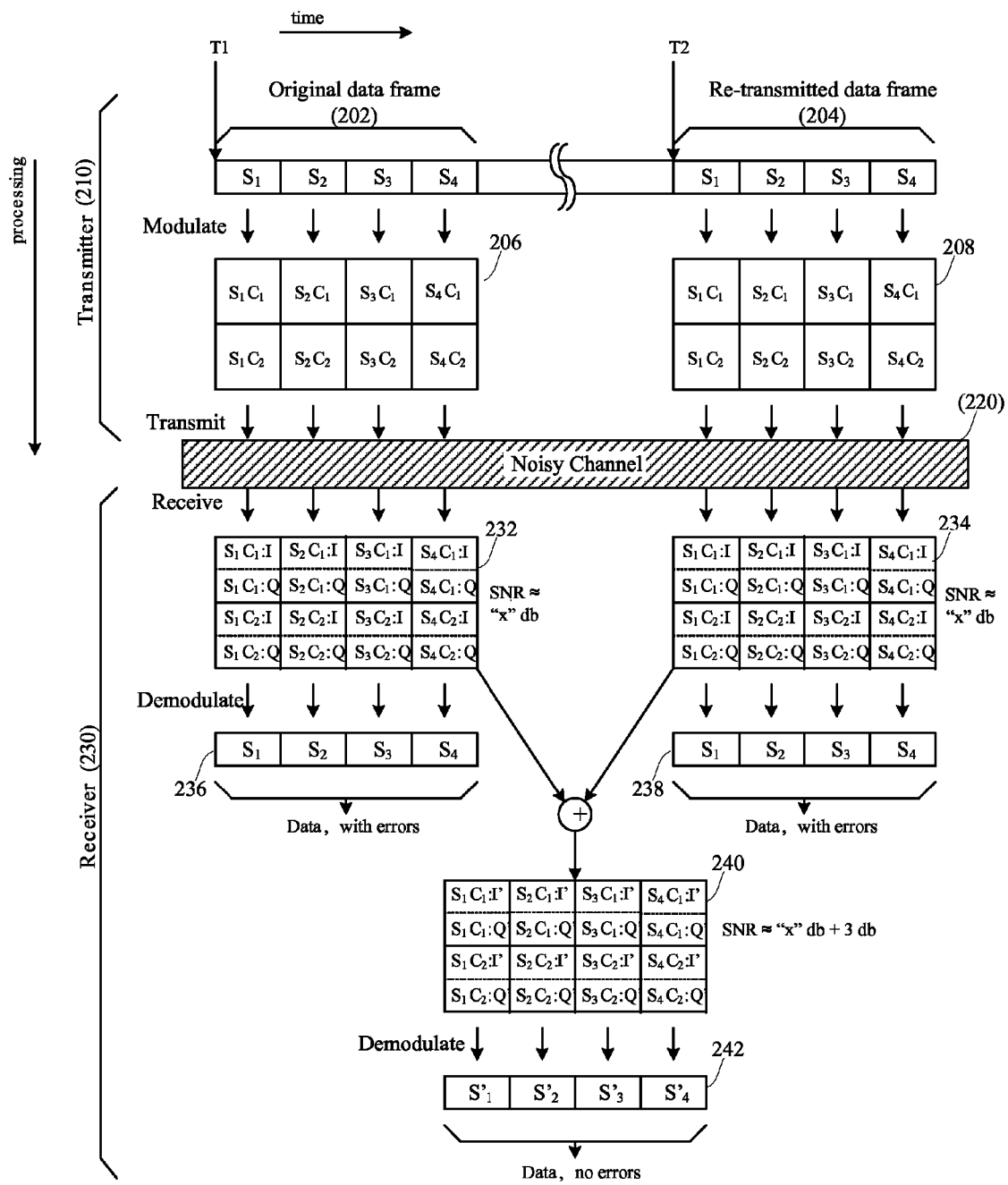
FIG. 2 shows an example transmission and accumulation of data symbols to improve the signal to noise ratio.

FIG. 2 shows an example transmission and accumulation of data symbols to improve the signal to noise ratio. Data frames (202 and 204) are transmitted from a transmitter 210 to a receiver 230 over a noisy communication channel 220. In this example, a first data frame 202, including 4 data symbols (S1, S2, S3, and S4), is modulated by the transmitter 210 to form data packet 206 for transmission. In this example, each of the modulated data symbols consists of two subcarriers, $C_1$ and $C_2$. Each of the subcarriers is modulated with data using one of many possible modulation techniques, such as QPSK. The data packet 206 is transmitted at time T1.

At the receiver 230, each sub-carrier of received data packet (e.g., 232) is separated into I and Q signal components, which are demodulated to determine the transmitted data symbols 236. In this example, the receiver 230 detects error(s) in the data symbols 236. The receiver 230 saves energy of I and Q components for each subcarrier of the data packet for later use (e.g., in respective accumulation registers), and requests retransmission by the transmitter. Frame 202 is again modulated with the same modulation scheme and retransmitted as frame 204, to form a second data packet 208, including the same data as the first data packet 206, which is retransmitted to the receiver.

The retransmitted data packet 234 is demodulated and data symbols 238 are checked for errors. If data symbols 238 are error-free, the previous data stored in the accumulation registers is discarded and the data symbols 238 from data packet 234 are output. Otherwise, from the phase alignment, the I and Q components of received data packet 234 are obtained for accumulating with the correspondingly stored I and Q components of the first data packet 232. For instance, I components (S1C1:I) corresponding to the first subcarrier (C1) of the first symbol (S1) are summed to form a respective accumulated value (S1C1I'). As another example, Q components (S2C2:Q) corresponding to the second subcarrier (C2) of the second symbol (S2) are summed to form a respective accumulated value (S2C2:Q'). The accumulated values 240 are demodulated to produce data symbols 242. If data symbols 242 of the accumulated values 240 are error-free, the data symbols 242 are output and the accumulated values 240 are discarded. Otherwise, the accumulated values 240 are saved and the data packet is retransmitted. This process repeats until the data symbols 242 demodulated from the accumulated values 240 are error-free.

Because energy is accumulated between data values corresponding to the same data symbol and the same modulation, data signals should be cumulative in the accumulated values. Conversely, because random noise in the channel may differ at time T1 and T2, noise components in the signals may cancel each other out over time. Due to this behavior, the accumulated values 240 should exhibit a signal-to-noise ratio (SNR) that is better than that of either of the received data packets 232 and 234. As an example, for additive white Gaussian noise (AWGN), one implementation was calculated to provide a SNR improvement of roughly 3 db over either of the individual data packets alone, as depicted in FIG. 2 with SNR shown therein as being approximately or roughly equal to (3+x) db.

Figure 3:
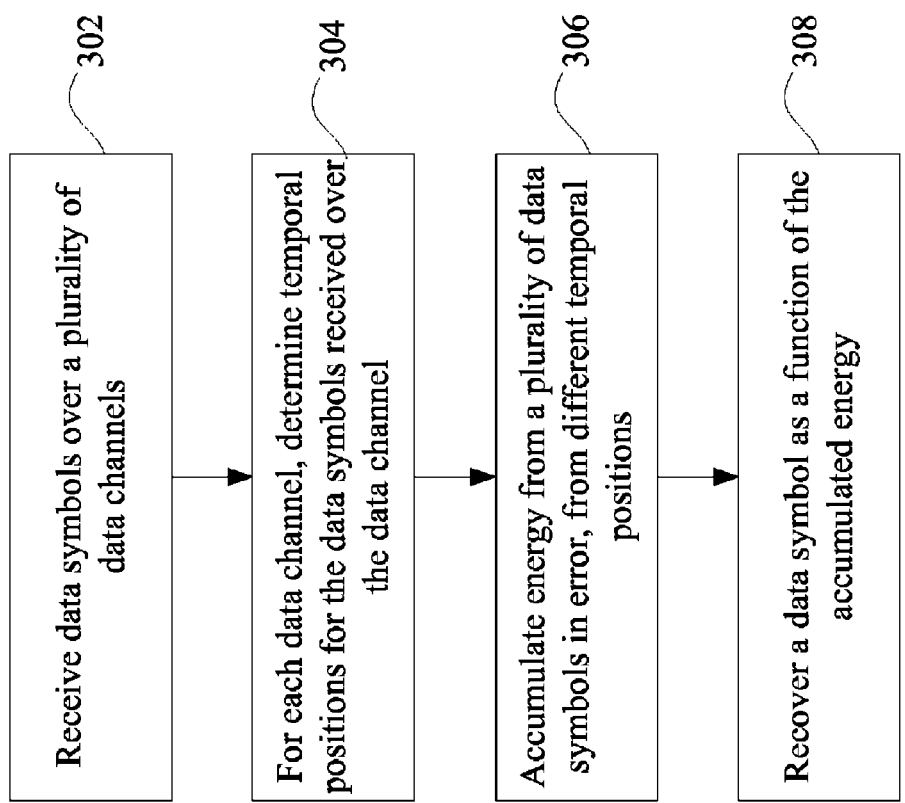
FIG. 3 shows a process for processing received data symbols in accordance with one or more embodiments.

FIG. 3 shows a process for processing received data symbols in accordance with one or more embodiments. At block 302, data symbols are received (e.g., by a receiver and/or signal processing circuit) over a plurality of data channels. At block 304, temporal positions of received data symbols are determined for each data channel. At block 306, energy is accumulated from a plurality of data symbols in error and received at different temporal positions. At block 308, data symbols are recovered as a function of the accumulated energy (e.g., as described with reference to FIG. 2).

Figure 4:
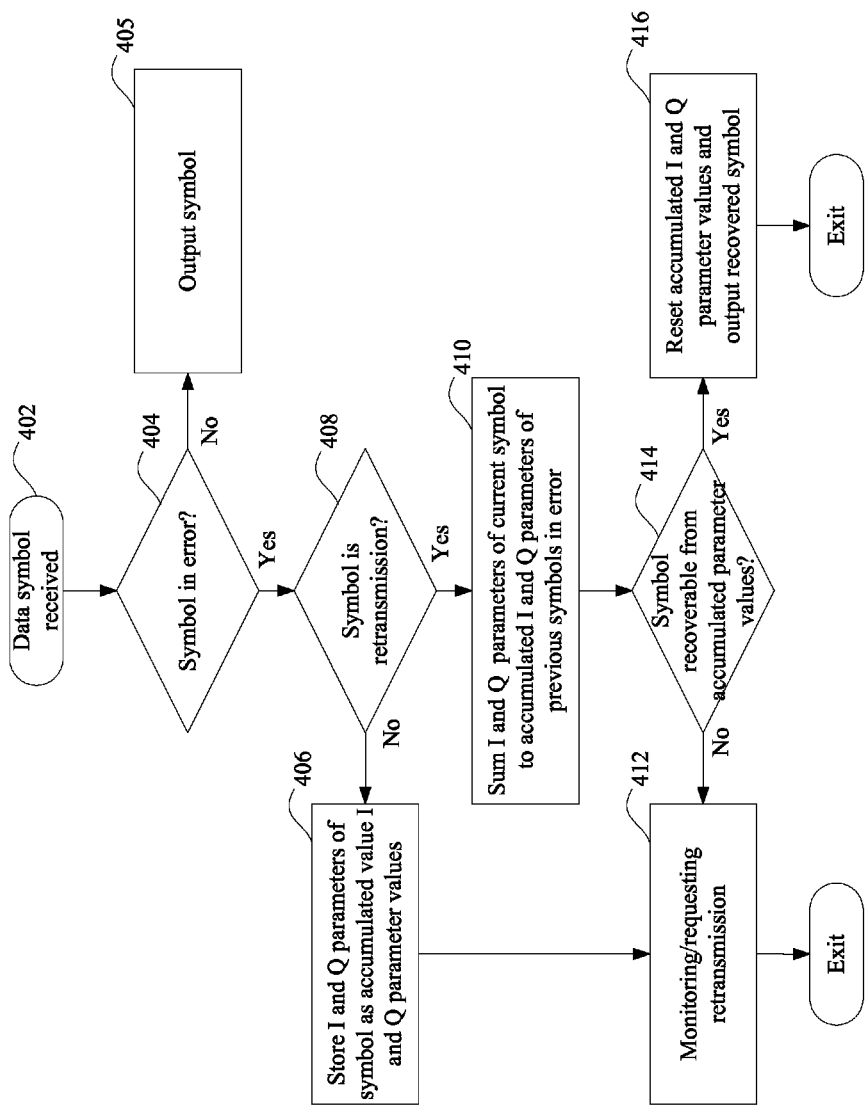
FIG. 4 shows a first process for retransmission and recovery of data symbols in accordance with one or more embodiments.

As indicated above, some embodiments use a modulation scheme (e.g., QAM) to encode multiple data values in each symbol using different phase components (e.g., I and Q components) of a carrier signal. FIG. 4 shows a first process for retransmission and recovery of data symbols having I and Q components, in accordance with one or more embodiments. At block 402 a data symbol is received. If the symbol is received error-free at decision block 404, the symbol is output at block 405. Otherwise, if the symbol is received in error and is not a retransmission (as determined at decision block 408), I and Q parameters of the symbol are respectively stored as accumulated I and Q values at block 406. Afterwards, at block 412, the data channel is monitored for a retransmission and/or retransmission is requested.

If the symbol received in error is a retransmission (as determined at decision block 408), I and Q parameters of the current symbol and those of the corresponding previous symbols in error are accumulated at block 410. If the data symbol is not recoverable from the accumulated I and Q values (as determined at decision block 414), the data channel is monitored for a retransmission and/or retransmission is requested at block 412. Otherwise, if the data symbol is recoverable from the accumulated I and Q values, the accumulated I and Q values are reset and the recovered symbol is output at block 416.

Figure 5:
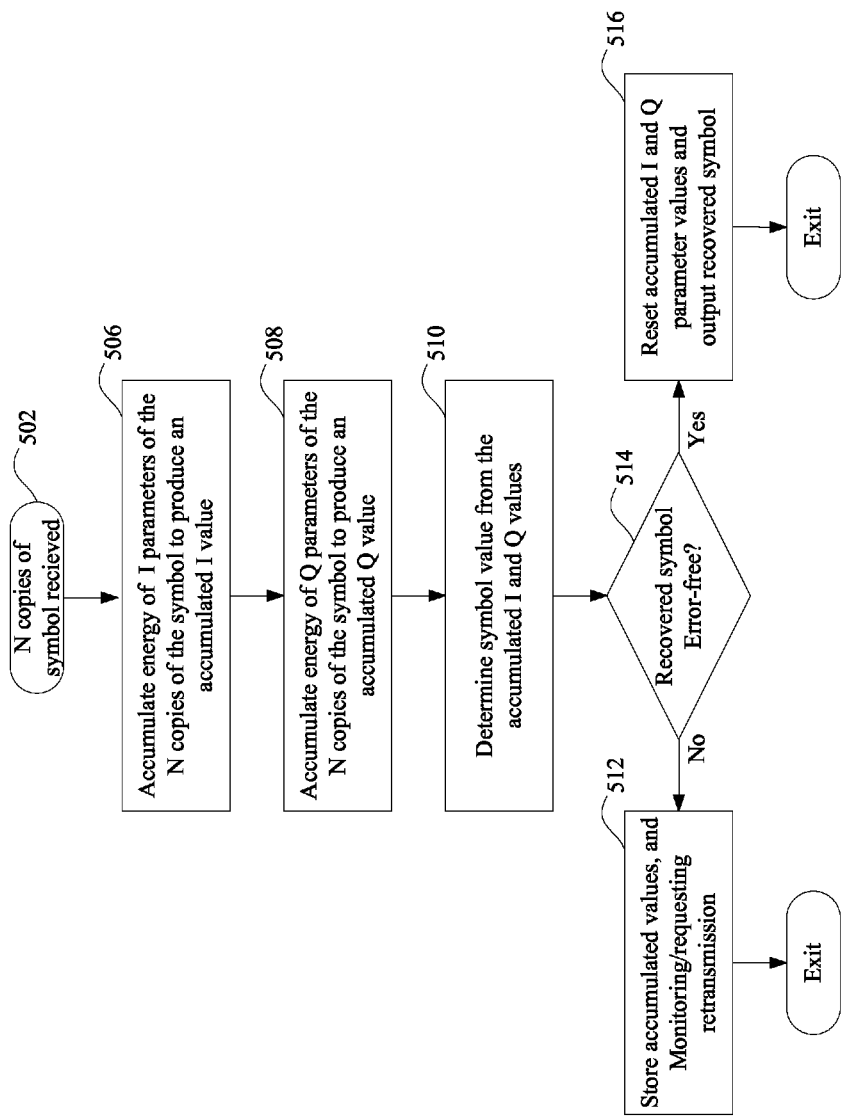
FIG. 5 shows a second process for retransmission and recovery of data symbols in accordance with one or more embodiments.

As indicated above, in some embodiments, transmission and/or retransmission(s) of a data packet may include multiple copies of a data symbol to be transmitted. FIG. 5 shows a second process for retransmission and recovery of data from transmissions that include multiple copies of a data symbol, in accordance with one or more embodiments. At block 502, a data packet including N copies of a data symbol is received. At block 506, energy of I components of the N copies of the data symbol are accumulated (and accumulated with a previous accumulated value, if available) to provide an accumulated I value. Similarly, at block 508, energy of Q components of the N copies of the data symbol are accumulated (and accumulated with a previous accumulated value, if available) to provide an accumulated Q value. A symbol value is determined from the accumulated I and Q values at block 510.

If the determined symbol value is error-free, at decision block 514, the symbol is output and accumulated values are reset at block 516. Otherwise, if the determined symbol is in error, accumulated values are stored at block 512. Also at block 512, the data channel is monitored for a retransmission and/or retransmission is requested. The process shown in FIG. 5 is repeated as retransmissions are received until an error-free data symbol is recovered.

Figure 6:
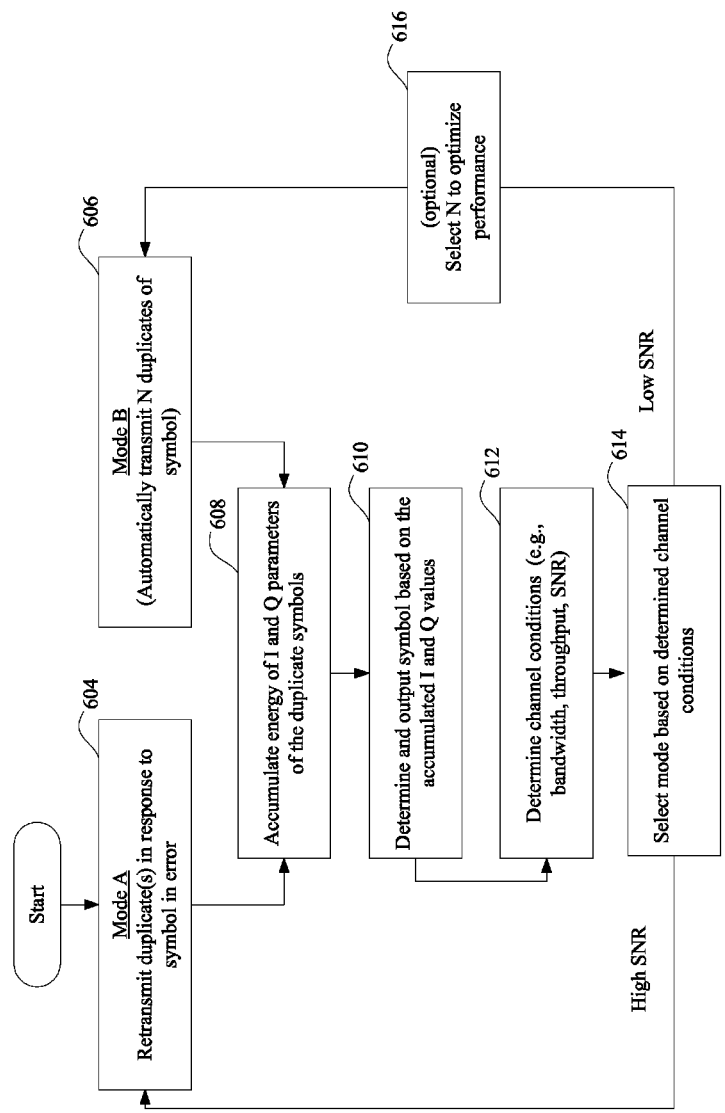
FIG. 6 shows a process for selection and adjustment of retransmission process based on conditions of a data channel used for transmission.

In some embodiments, the scheme used for retransmission may be changed and/or adjusted based on channel conditions (e.g., error rate and SNR). FIG. 6 shows a process for selection and adjustment of retransmission process based on channel conditions. In this example, retransmission is performed according to one or two schemes in mode A 604 and mode B 606. While operating in mode A 604, retransmission of a single symbol is initiated in response to receiving a symbol in error, as described with reference to FIG. 4. While operating in mode B, N duplicates of a symbol are automatically included in each transmission/retransmission, as described with reference to FIG. 5.

At block 608, energy of I and Q parameters are respectively accumulated as described with reference to FIGS. 2-5. At block 610, symbols are determined based on the accumulated I and Q values and output. At block 612, channel conditions are determined. At block 614, retransmission mode is selected based on the determined channel conditions. In this example, if the channel exhibits a high signal to noise ratio, retransmission mode A is selected. This reduces the size of data packets when retransmission is not likely to be required. Conversely, if the channel exhibits a low signal to noise ratio, retransmission mode B is selected. This reduces the number of retransmissions by providing multiple copies of the data symbol in each transmission. Optionally, at block 616, the number (N) of duplicate symbols provided in each transmission may be adjusted. In one implementation, a larger N is used if channel conditions become worse and a lower N is used if channel conditions improve.

Figure 7:
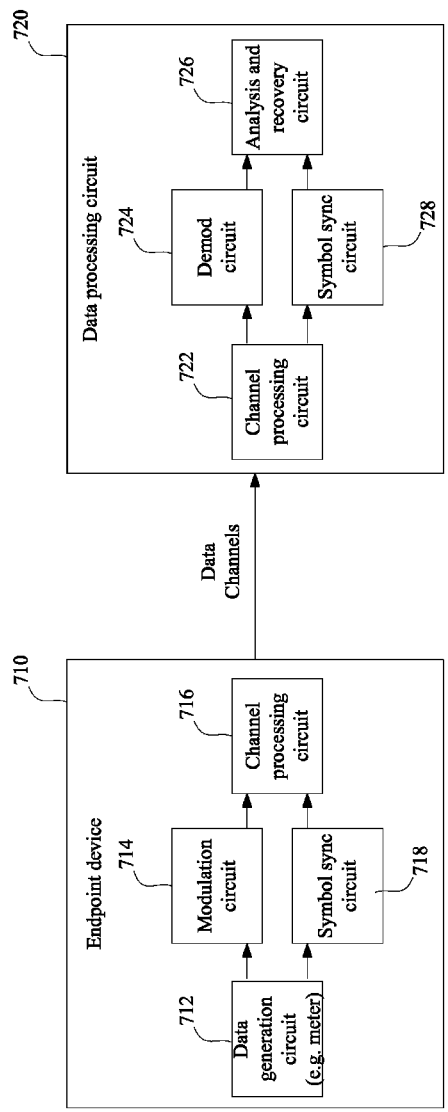
FIG. 7 is a block diagram of an example communication system, in accordance with one or more embodiments.

FIG. 7 is a block diagram of an example communication system, in accordance with one or more embodiments. A processing circuit 720 (e.g., central command station in a PLC network) is communicatively connected to receive data symbols transmitted by an endpoint 710 over one or more communications channels of a wired connection. In this example, the endpoint includes data generation circuitry 712 (e.g., a power meter) that generates data to be communicated. Symbols are modulated by modulation circuit 714 and temporally synchronized by symbol sync circuit 718. Modulated symbols are transmitted over the wire connected by channel processing circuit 716. A channel processing circuit 722 of the data processing circuit 720 is configured to receive the transmitted data symbols. Symbols are demodulated by demod circuit 724 and synchronized by symbol sync circuit 728. Analysis and recovery circuit 726 accumulates energy of symbols received in error and determines a correct data value of the symbol from the accumulated energy, as described in FIGS. 1-6.

Figure 8:
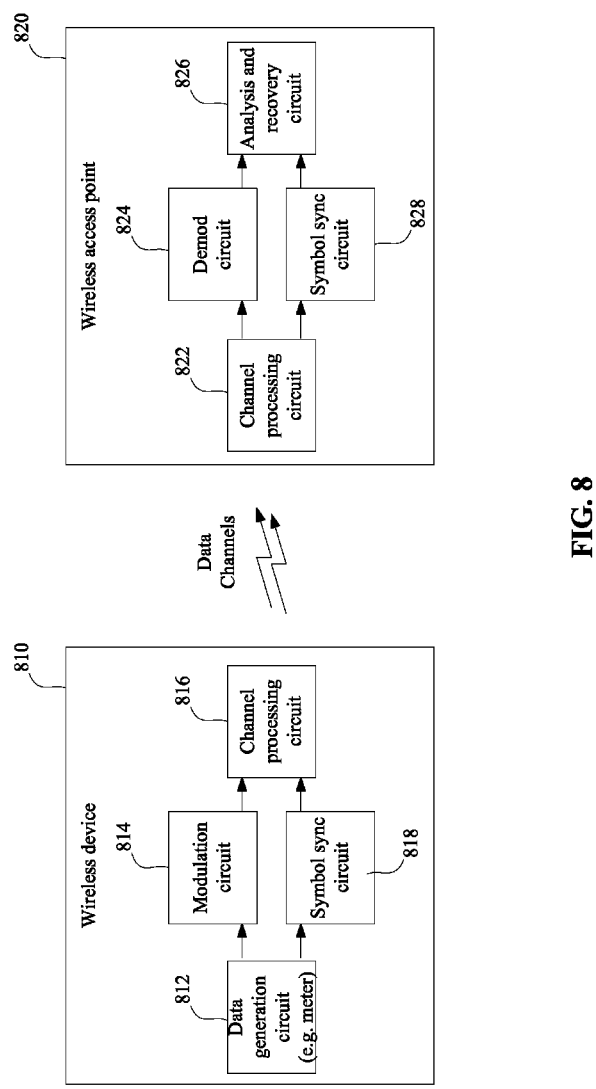
FIG. 8 is a block diagram of an example wireless communication system, in accordance with one or more embodiments.

Although data symbols in FIG. 7 are communicated over a wired connection, various embodiments may recover data values of symbols transmitted over wireless mediums. For example, FIG. 8 shows a block diagram of an example wireless communication system, in accordance with one or more embodiments. In this example, a wireless access point 820 is communicatively connected to receive data symbols wirelessly transmitted by a wireless device 810. In this example, the wireless device 810 includes data generation circuitry 812 (e.g., a power meter) that generates data to be communicated. Symbols are modulated by modulation circuit 814 and temporally synchronized by symbol sync circuit 818. Modulated symbols are transmitted wirelessly by channel processing circuit 816. A channel processing circuit 822 of the wireless access point 820 is configured to receive the transmitted data symbols. Symbols are demodulated by demod circuit 824 and synchronized by symbol sync circuit 828. Analysis and recovery circuit 826 accumulates energy of symbols received in error and determines a correct data value of the symbol from the accumulated energy, as described in FIGS. 1-6.

The processes described herein can be implemented by various types of analog/digital electronic circuitry, or in computer software, firmware, or hardware, including the structures disclosed in this specification and their structural equivalents, or in combinations of one or more of them. For example, a data processing apparatus may be any of various different apparatus, devices, and machines for processing data including, by way of example, instructions executed on a processor, a computer, a system on a chip, or multiple ones, or various combinations of these. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

The processes and logic flows described in this specification can be performed by one or more programmable processors executing one or more computer programs to perform actions by operating on input data and generating output data. The processes and logic flows can also be performed by, and an apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface. The components of the system can be interconnected by any form or medium of digital data communication, e.g., a communication network.

Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on respective computers and having a client-server relationship to each other. In some embodiments, a server transmits data to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features of another figure even though the combination is not explicitly shown or explicitly described as a combination. It is intended that the specification and illustrated embodiments be considered as examples only, with a true scope of the invention being indicated by the following claims.

The invention claimed is:

1. A system comprising:
   a plurality of endpoints that are each configured to provide power-meter reports by transmitting data symbols over a power line using a respective one of a plurality of data communications channels; and
   a data processing apparatus that is configured and arranged to interact with the plurality of endpoints and to
   receive the data symbols transmitted over the plurality of data communications channels, each of the data symbols being transmitted in one of a plurality of temporal positions assigned for communication by one of the plurality of endpoints over which a symbol is transmitted, the symbol being represented by communications signals,
   for each of the plurality of data communications channels, determine temporal positions for the data symbols received over the communications channel, including at least two of the data symbols having different temporal positions for respective symbols and one of the at least two of the data symbols being a retransmission of the other of the at least two of the data symbols,
   with phases of the at least two data symbols aligned per a common reference point, accumulate energy from said at least two of the data symbols and to discern data therefrom, as a function of a signal versus noise measure for the communications signals that are received over the communications channels, and
   provide the discerned data in the form of a data symbol.

2. The system of claim 1, wherein:
   the other of the at least two of the data symbols is retransmitted either for a given symbol or for a group of data symbols;
   each of the at least two data symbols has a respective signal to noise ratio (SNR); and
   the accumulated energy has a SNR that is higher than the respective SNR of either of the at least two data symbols.

3. The system of claim 1, wherein the data processing apparatus is further configured and arranged to, in response to receiving a first data symbol of the at least two data symbols in error:
   save a copy of the first data symbol; and
   send a request to the one of the plurality of endpoints that transmitted the first data symbol, to retransmit the first data symbol.

4. The system of claim 3, wherein the data processing apparatus is further configured and arranged to, in response to receiving a second data symbol of the at least two data symbols that is in error and is a retransmission of the first data symbol, accumulate energy of the first and second data symbols to produce a third data symbol.

5. The system of claim 1, wherein the data processing apparatus is further configured and arranged to:
   in response to receiving a first data symbol of the at least two data symbols in error:
   save a copy of the first data symbol; and
   send a request to the one of the plurality of endpoints that transmitted the first data symbol, to retransmit the first data symbol;
   in response to receiving a second data symbol of the at least two data symbols that is in error and is a retransmission of the first data symbol, accumulate energy of the first and second data symbols to produce a third data symbol; and
   in response to the third data symbol being in error, send a request to the one of the plurality of endpoints to retransmit the first data symbol.

6. The system of claim 1, wherein each of the plurality of endpoints is configured to encode data symbols for retransmission using the same modulation as a first data symbol that is to be retransmitted.

7. The system of claim 1, wherein the data processing apparatus is further configured and arranged to align phases of the at least two of the data symbols.

8. The system of claim 1, wherein the data processing apparatus is further configured and arranged to align the at least two of the data symbols at the common reference point.

9. The system of claim 1, wherein the phases are represented by in-phase and quadrature-phase energy components, and wherein the data processing apparatus is configured to separately sum the in-phase energy components and separately sum the quadrature-phase energy components of the at least two data symbols aligned at the common reference point at the beginning of each of the at least two data symbols.

10. The system of claim 1, wherein the phases are represented by in-phase and quadrature-phase energy components, and wherein the data processing apparatus is configured to separately sum the in-phase energy components and separately sum the quadrature-phase energy components of the at least two data symbols aligned at the end of each of the at least two data symbols.

11. The system of claim 1, wherein each of the at least two data symbols are modulated with a same encoding scheme.

12. The system of claim 1, wherein the at least two data symbols are each received by the data processing apparatus over the same one of the plurality of data communications channels.

13. The system of claim 1, wherein the retransmission of the other data symbol is performed over a communications channel, and wherein the retransmission of the other data symbol occurs according to at least one of the following protocols: automatically a plurality of times, and in response to a request for retransmission as received over the communications channel.

14. A system comprising:
one or more endpoint devices configured and arranged to transmit data symbols over a plurality of data communications channels; and
a data processing apparatus including data-communication circuitry communicatively coupled to the one or more endpoint devices and being configured and arranged to:
receive the data symbols transmitted over the plurality of data communications channels;
for each of the plurality of data communications channels, determine temporal positions for the data symbols received over the data communications channel, including at least two of the data symbols having different respective temporal positions and being aligned per a common reference point, and one of the at least two of the data symbols being a retransmission of the other data symbol;
accumulate energy from said at least two of the data symbols; and
determine a third data symbol from the accumulated energy.

15. The system of claim 14, wherein at least one of the one or more endpoint devices is a residential power meter and is configured and arranged to transmit the data symbols over power lines.

16. The system of claim 14, wherein at least one of the one or more endpoint devices is a relay sub-station monitoring circuit and is configured and arranged to transmit the data symbols over power lines.

17. The system of claim 14, wherein the one or more endpoint devices includes local area network devices configured and arranged to transmit the data symbols wirelessly, and wherein the data processing apparatus includes a wireless router.

18. The system of claim 14, further including a cellular-telephone transceiver station that includes the data processing apparatus, and further including cellular telephones that respectively include the endpoint devices; the cellular telephones being configured and arranged for communicating with the cellular-telephone transceiver station wherein the retransmission of the other data symbol is performed over a wireless channel.

19. The system of claim 14, wherein the retransmission of the other data symbol is performed over a wireless channel, and wherein the retransmission of the other data symbol occurs according to at least one of the following protocols: automatically a plurality of times, and in response to a request for retransmission as received over the wireless channel.

20. The system of claim 14, wherein the retransmission of the other data symbol occurs automatically a plurality of times.

* * * * *